Patented Mar. 29, 1938

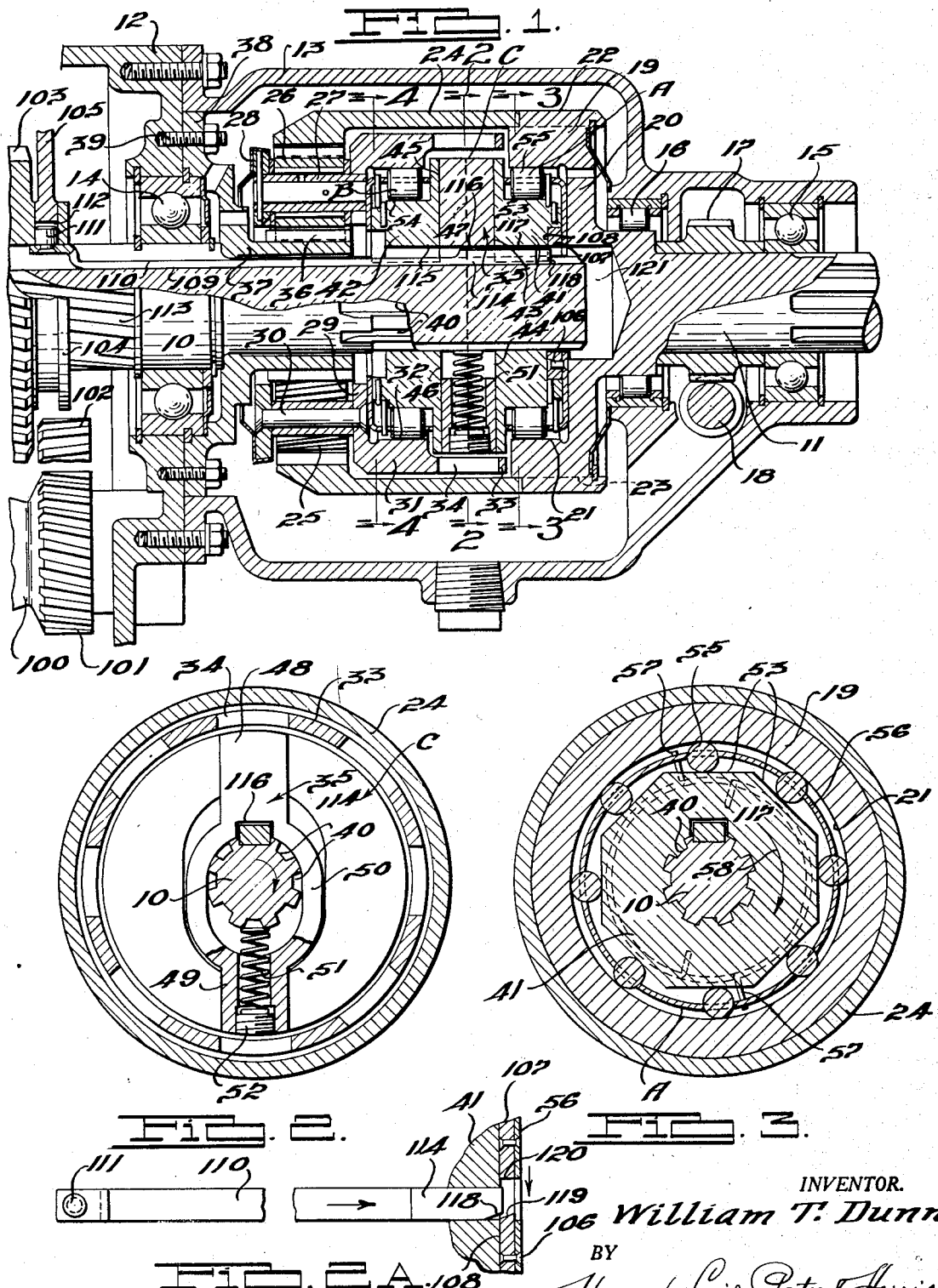

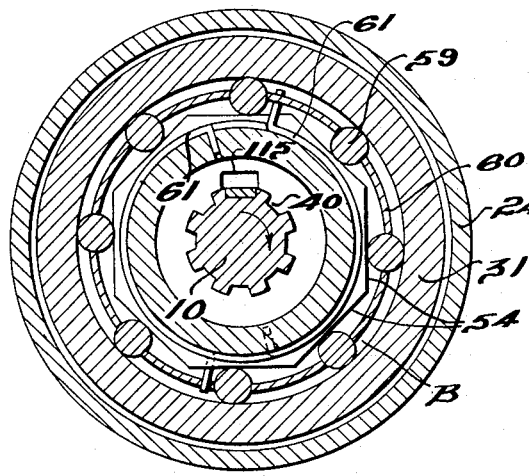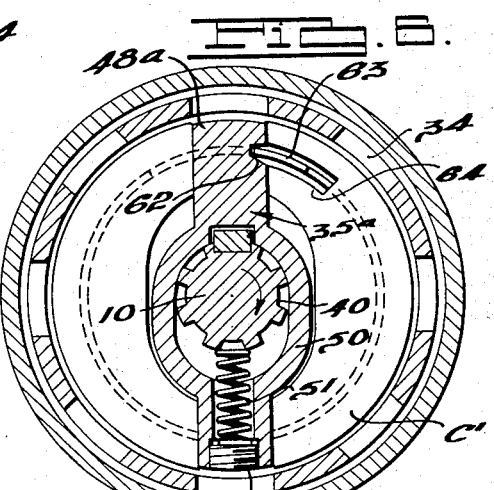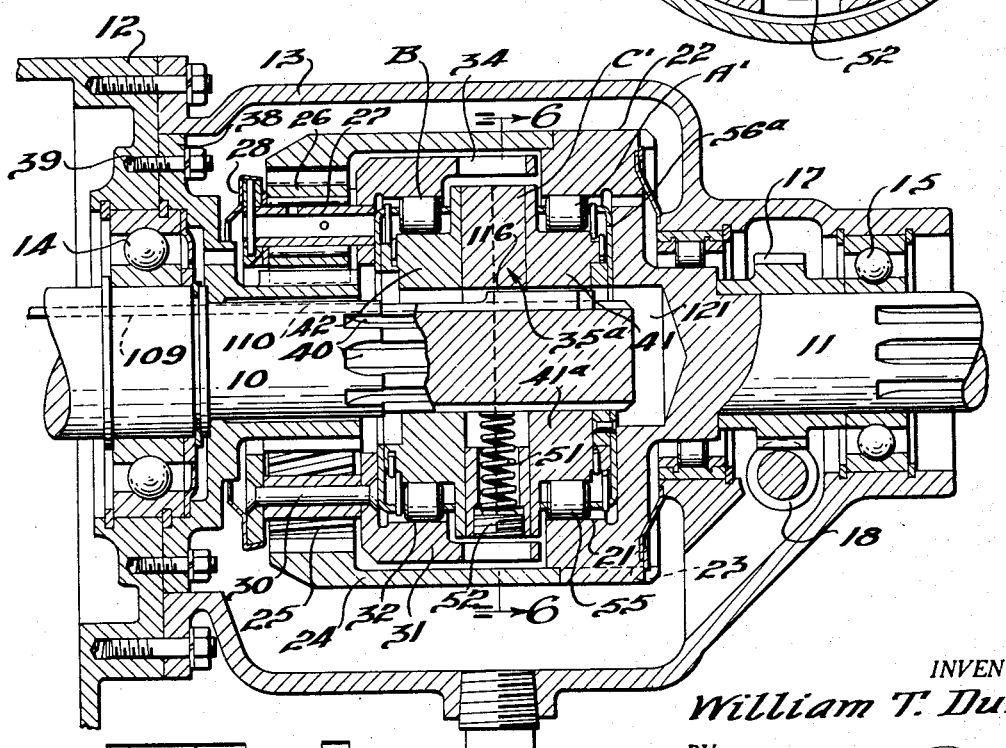

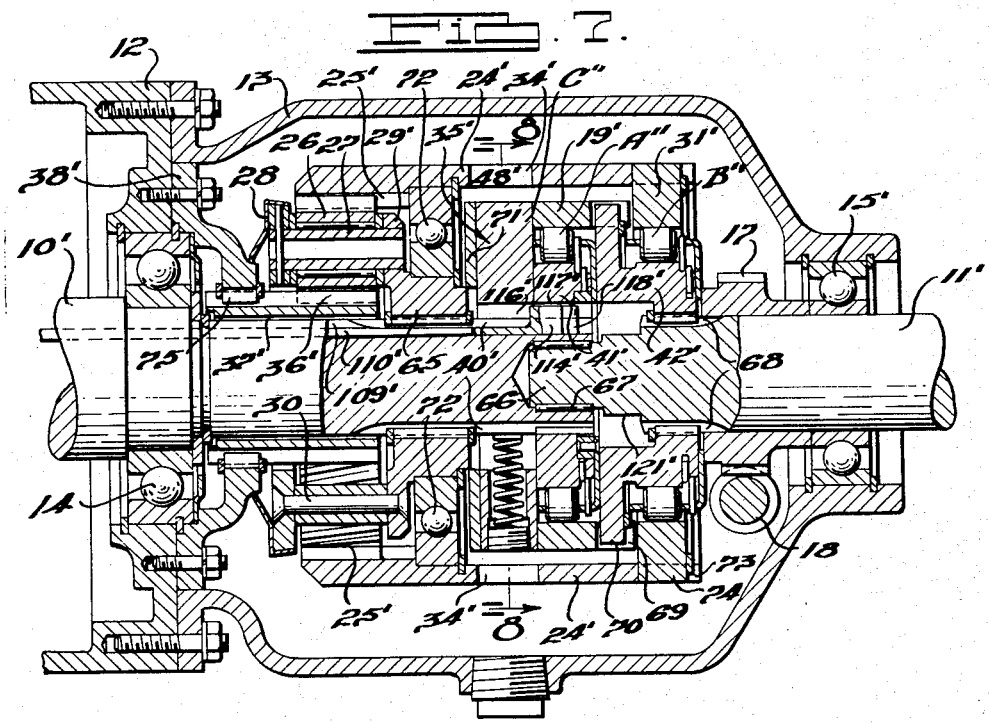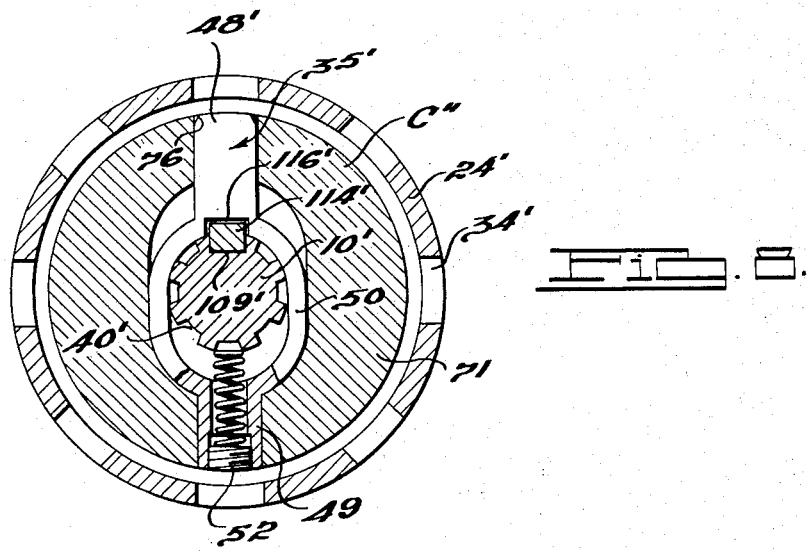

2,112,619

UNITED STATES PATENT OFFICE 2,112,619

POWER TRANSMISSION

William T. Dunn, Detroit, Mich., assignor to Chrysler Corporation, Highland Park, Mich., a corporation of Delaware Application September 26, 1935, Serial No. 42,266

33 Claims. (Cl. 74—260)

This invention relates to power transmission and refers more particularly to improvements in speed ratio changing mechanism especially adapted for use in driving motor vehicles.

One object of my invention is to provide an improved speed ratio changing mechanism preferably providing an overdrive, or a speed greater than one to one between driving and driven shafts in the transmission of power from the engine to the vehicle ground wheels.

More particularly, further objects of my invention are to provide a mechanism of the character aforesaid having improved characteristics of long life, quietness of operation, automatic response to the speed of vehicle travel, simplification of parts, and relatively low cost of manufacture.

Another object of my invention is to provide an automatic overdrive mechanism between driving and driven shafts incorporating releasable means in the normal direct drive between the shafts and wherein the releasable means provides a two-way drive prior to the synchronizing action of the members of the automatic clutch at or above the critical speed of clutch engagement; also releasable means for the normal direct drive which may pass through a clutch, preferably of the roller type, to provide a direct drive acting in conjunction with a further clutch of opposite action and so arranged that the overrun of the first clutch is limited by the second clutch in facilitating synchronization of the automatic clutch members.

A further object of my invention is to provide an improved arrangement of driving means providing the overdrive gear train, this gear train being controlled by an automatic clutch of the centrifugal force operated type, in combination with oppositely acting releasable driving means providing controlled relative rotation between the driving and driven shafts for permitting the driven shaft to overrun the driving shaft in synchronizing the rotational speeds of the automatic clutch structures while providing a two-way drive at speeds of the shafts insufficient to operate the automatic clutch.

Further features of my invention reside in an improved direct driving clutching means for controlling an overdrive; also an improved direct driving clutching means having rollers adapted to provide a direct drive connection and a control therefor operable by movement of the centrifugal force operated element of the overdrive control clutching means.

A further object of my invention is to provide an automatic overdrive of simplified construction and operation adapted to function in controlling the direct drive, overdrive, and reverse drive.

Additional objects are to provide for simplification in the manufacture and operation of an automatic overdrive; an overdrive having a novel arrangement for centering rotative parts by thrust absorbing means associated with the overdrive gearing; and an overdrive having characteristics of smoothly effecting changes in the driving speeds.

Further objects and advantages of my invention will be more apparent from the following detailed description of several illustrative embodiments of my invention, reference being had to the accompanying drawings in which:

Fig. 1 is a sectional elevational view of one embodiment of my overdriving mechanism.

Fig. 2 is a transverse sectional elevational view taken as indicated by line 2—2 in Fig. 1, showing the automatic centrifugal clutch.

Fig. 2A is a top plan view of the reverse shifting member showing the engaged overrunning clutch parts in cross section.

Fig. 3 is a transverse sectional view taken as indicated by line 3—3 of Fig. 1, illustrating one of the releasable or overrunning clutch devices.

Fig. 4 is a transverse sectional view taken as indicated by line 4—4 of Fig. 1, showing the other of the releasable or overrunning clutch devices.

Fig. 5 is a view generally similar to Fig. 1 but illustrating a modified form of my invention.

Fig. 6 is a transverse sectional view taken as indicated by the line 6—6 in Fig. 5 showing the automatic clutch and control therefor.

Fig. 7 is a view generally similar to Fig. 1 but illustrating a further modification of my invention.

Fig. 8 is a transverse sectional view taken as indicated by line 8—8 in Fig. 7 showing the automatic centrifugal clutch.

Referring to the drawings, I have illustrated my overdriving mechanism in Figs. 1 to 4 as operating between a power driving shaft 10 and a driven shaft 11. These two shafts may be arranged anywhere along the line of power transmission between the usual engine and driving ground wheels of the motor vehicle and inasmuch as such parts are well known, I have not illustrated them in my drawings. The shaft 10 preferably receives its drive from the usual change speed transmission mechanism which may be located in the casing 12 to the rear of which is located the casing 13 for housing the overdriving mechanism.

Shaft 10 is suitably rotatably journalled, one bearing therefor being shown at 14 while shaft 11 is rotatably journalled by bearings 15 and 16, the usual speedometer drive being taken from shaft 11 by the gearing 17 and 18 in a well known manner.

The driven shaft is provided with an enlarged forward extension 19 coaxial with the aligned axes of shafts 10 and 11 and surrounding the rear end of shaft 10. While this enlarged projection may be built up with shaft 11 (as in Fig. 6 hereinafter referred to), such projection is illustrated in Fig. 1 as being integrally connected with shaft 11 through a hub 20.

The projection 19 is provided with a forwardly opening cylindrical bore 21 whereby the projection 19 provides the outer clutching member or portion of a releasable or overrunning clutch device generally indicated at A. Projection 19 is also formed with a plurality of circumferentially spaced radial projections 22 adapted to fit into rearwardly extending slots 23 of a cylindrical driving member 24 surrounding shaft 10 and mounted concentrically therewith.

The forward end of the driving member 24 carries an internal gear 25 meshing with a plurality of circumferentially spaced planetary gears 26. The planetary gears are mounted on axles 27 connected by the ring-like carriers 28 and 29, the latter carrier functioning as a driving member for planetary gears 26 under conditions presently more apparent. These carriers may also be connected intermediate a pair of the planetary gears by suitable spacing structures 30 and the carrier 29 is provided with a hollow portion 31 having a rearwardly opening cylindrical bore 32 providing the outer clutch member or portion of a second releasable or overrunning clutch device generally indicated at B.

The hollow portion 31 has a further rearward extension 33 formed with a plurality of circumferentially spaced openings or slots 34 adapted for clutching engagement with the centrifugal force operated clutching element 35 of the automatic clutch C as will presently be more apparent.

The planetary gears 26 also mesh with a sun gear 36 carried by a sleeve 37 freely surrounding shaft 10 and having an outwardly extending flange 38 non-rotatably secured by fasteners 39 to the stationary casing 12. The teeth of the illustrated planetary gear train may be formed helically in order to facilitate the quiet operation of the gear train.

The rear end of the driving shaft 10 is provided with splines 40 for drivingly mounting a pair of complementary members 41 and 42 which respectively form the inner members or portions of clutches A and B and which together provide a cage for slidably carrying the centrifugal clutching element 35.

One feature of the present embodiment of my invention, in its more limited aspects, consists in forming the members 41 and 42 as similar or companion parts and where this feature of my invention is used these members are respectively provided with diametrically opposite radially extending companion guideways 43, 44 and 45, 46 so that when the members 41 and 42 are placed back to back for contacting surfaces at 47, the guideways 43 and 45 will cooperate to slidably receive the clutching portion 48 of the centrifugal element 35 while the guide-ways 44 and 46 will likewise cooperate to slidably receive the diametrically opposite counterbalance guide portion 49 of the centrifugal element 35.

The portions 48 and 49 of the centrifugal element 35 are connected together by a yoke portion 50 which surrounds the splined end of shaft 10, the shaft serving to limit movement of element 35 in its extreme positions of opposite movement. A spring 51 acts between shaft 10 and an adjustable abutment screw 52, this spring acting to yieldingly urge the element 35 to the declutched position illustrated in Fig. 2 where the clutching portion 48 is free from engagement with the slots 34.

The members 41 and 42 are formed with the cam surfaces 53 and 54, respectively, and for convenience of manufacture these cam surfaces may be similarly formed so that the parts 41 and 42 are complementary to each other, although as will be presently apparent a portion of each cam surface is not used. The clutch A further comprises a plurality of cylindrical rollers 55 disposed between the cylindrical opening 21 and the cam surfaces 53, a cage 56 serving to properly space rollers 55. Coil springs 57 surround member 41, these coil springs being anchored at one end to the member 41 and having their other ends acting on cage 56 yieldingly urging this cage in a direction opposite to the normal direction of rotation of shaft 10 and member 41 as indicated by the arrow 58 in Fig. 3. The clutch B has a similar arrangement of parts comprising corresponding rollers 59, cage 60 and coil springs 61 but in this instance the springs yieldingly urge rollers 59 in the same direction as the normal direction of rotation of shaft 10 and member 42 which is clockwise with the parts as viewed in Fig. 4 and assuming the driving shaft 10 to normally rotate clockwise when viewed from front to rear.

It will, therefore, be apparent that the clutches A and B are effective for opposite directions of rotation of shaft 10 and for convenience of reference the clutch A may be designated as a right-hand clutch and the clutch B as a left-hand clutch. While other forms of releasable clutches or couplings may be employed if desired, I prefer to use the cam and roller type of clutch as illustrated since it is relatively simple in construction and operation and has been used to good advantage with free wheeling drives.

In order to provide for a reverse drive between shafts 10 and 11 for reversing the direction of vehicle travel, the following mechanism is provided.

In Fig. 1, the transmission 12 is shown with a portion of the change speed gearing which, for convenience of illustration, may be of the well known countershaft sliding gear type. Such transmission comprises the countershaft 100 adapted for constant drive from the usual engine drive shaft (not shown), this countershaft having the pinion 101 in constant mesh with reverse idler gear 102. Slidably splined on shaft 10 is the low speed and reverse gear 103 shiftable by collar 104 engaged by the usual fork 105 which is connected in a well known manner (not shown) to the usual gear shift control lever.

In order to reverse the normal direction of drive of shaft 10, gear 103 is shifted rearwardly to mesh with idler 102. When this shifting takes place, the clutch A is rendered inoperative by the following mechanism the desirability of which will be presently apparent.

The inwardly extending flange of cage 56 has riveted thereto at 106 a ring 107 freely surrounding splines 40. The ring 107 is located in an opening 108 of member 41. One of the splines 40 is extended forwardly at 109 to slidably accommodate a shift key 110 having the forward end provided with a pin 111 which projects upwardly into an arcuate slot 112 in collar 104 so that when gear 103 is axially shifted, the key 110 is likewise axially shifted. The slot 112 has sufficient circumferential clearance with pin 111 so that gear 103 can slightly rotate relative to pin 111 during gear shifting where helical splines 113 are employed on shaft 10 for the gear 103.

The key 110 has a forward enlargement 114 shown in Figs. 1 and 2A freely slidable in aligned axial slots or grooves 115, 116, and 117 respectively formed in member 42, pawl 35, and member 41. In Fig. 2A the parts are in the normal direct forward drive between shafts 10 and 11, through clutch A, it being noted that cage 56 may slightly move in the direction of arrow 58 relative to member 41 when shaft 11 and extension 19 rotate faster than member 41 and shaft 10.

The rearward end of key enlargement 114 is bevelled at 118 for slidable contact with bevel 119 of ring 107, this ring and cage 56 having an opening 120 to receive the end of enlargement 114 when shifted rearwardly. During such rearward shifting the bevel 118 engages bevel 119 to rotate ring 108 and cage 56 in the direction of arrow 58 sufficiently to hold rollers 55 in their neutral positions on cams 53 so that they cannot lock up as in the Fig. 3 position.

The slots 115 and 116 will accommodate forward movement of key enlargement 114 when gear 103 is shifted forwardly to drive shaft 10 in a low speed forward direction, it being further noted that shaft recess 121 will accommodate rear shifting of enlargement 114.

This reverse lock out of clutch A is desirable since, as will be presently apparent, shaft 11 is driven faster than shaft 10 when reversing. This would tend to lock up clutch A in direct drive relationship. The reverse overall drive from the engine to shaft 11 is a reduction drive by reason of the reverse gear set 101, 102, and 103.

In the operation of the power transmission, let it first be assumed that the engine is driving the motor vehicle in the normal forward direction at a speed less than that sufficient to cause the element 35 to be projected outwardly by centrifugal force operating thereon in opposition to the spring 51. For convenience of reference the rotational speed of this centrifugal element 35 which is sufficient to cause outward movement for clutching with one of the slots 34 may be termed the critical speed. Under the aforesaid assumed conditions, shaft 10 will rotate clockwise in the direction of arrow 58 as viewed in Fig. 3, the cam driving members 41 and 42 also rotating clockwise along with the centrifugal element 35. Such rotation will cause the following portions of cam faces 53 of clutch A to wedge the rollers 55 in conjunction with the cylinder 21 so that the driven shaft extension 19 is releasably locked with member 41 and driven therewith in a clockwise direction. The key 110 occupies the position illustrated in Figs. 1 and 2A.

This clockwise rotational movement of projection 19 is of course transmitted to driven shaft 11 for imparting a forward driving speed to the motor vehicle. During this forward drive which is a direct drive or a speed ratio of one to one between shafts 10 and 11, the driven shaft carries with it the cylindrical member 24 causing the internal gear 25 to operate the planetary gears 26 around the stationary sun gear 36 to rotate the slots 34 in a clockwise direction and at a speed less than that of shaft 10 depending on the value of the planetary gear train as may be desired. During this normal direct drive the clutch B overruns since member 42 rotates clockwise at a speed greater than that of cylinder 32 but springs 61 operate through cage 60 to hold the rollers 59 toward the leading portions of the cam faces 54 preventing wedging engagement of rollers 59. It is generally deemed desirable to provide a two-way drive so that when coasting the engine may be used as a brake even when the automatic clutch C is disengaged and to this end it will be observed that under the foregoing assumed condition of direct drive at less than the critical speed, when the motor vehicle operator releases the usual accelerator pedal tending to slow down the driving shaft 10, the momentum of the motor vehicle tends to continue the rotation of driven shaft 11.

This will cause the clutch A to release for the reason that the outer clutch portion or cylinder 21 moves faster than the member 41 thereby urging rollers 55 toward their neutral positions midway of the cam faces 53 where they are free from engagement with the cylinder 21 or cams 53. It will be understood, however, that these rollers, in the illustrated arrangement, do not actually move to these neutral positions (except when positively shifted by key 110 for the reverse drive) for the reason that springs 57 yieldingly urge the rollers toward their engaged positions but they cannot lock during this overrunning action because of the tendency of cylinder 21 to constantly urge the rollers toward the aforesaid neutral positions.

The aforesaid overrunning action quickly reduces the speed of driving shaft 10 below that of driven shaft 11, so that the clutch B will engage approximately when the rotational speeds of cylinder 32 and member 42 are synchronized. In other words, as long as member 42 is rotating faster than cylinder 32, the rollers 59 will not be wedged to drivingly lock these parts but as the speed of the driving shaft is reduced relative to that of cylinder 32, this cylinder approaches the speed of member 42 and then tends to drive faster than shaft 10. At this time which is approximately at the time of synchronization of the speeds of cylinder 32 and member 42, rollers 59 being constantly yieldingly urged to their normal locking positions will be wedged so that the hollow shaft 31 will then drive member 42 and shaft 10 through the rollers 59 preventing any further reduction in the speed of shaft 10 relative to that of shaft 11. This very short time interval of overrun of driven shaft 11 accompanied by release of clutch A and engagement of clutch B also serves to facilitate engagement of the automatic clutch C as will be presently apparent. Returning to the assumed conditions of driving and with the driven shaft 11 now driving the engine through shaft 10 by reason of the planetary gearing and the clutch B, let it be presumed that the operator again depresses the accelerator pedal so that the shaft 10 is rotated faster than the shaft 11. Under such conditions the clutch B will immediately be released and as soon as the member 41 has approached the speed of cylinder 21 and driven shaft 11, the rollers 55 of clutch A are ready to be wedged so that on any further increase in the speed of driving shaft 10 will cause these rollers to lock and thereby again transmit the direct drive from shaft 10 to shaft 11.

Let it now be presumed that shaft 10 is driving shaft 11 at some speed above the critical speed of engagement for the automatic clutch C. This speed will, of course, depend on the character of the drive, the ratio of the driving parts between shaft 11 and the motor vehicle ground wheels where the mechanism is used for driving a motor vehicle, the value of spring 51 and the adjustment thereof by the member 52, and many other variable factors. Where the mechanism is used as a motor vehicle overdrive, it is usually preferred to arrange the parts so that the centrifugal element 35 will be moved outwardly toward its clutching position whenever the motor vehicle reaches a speed of about 45 miles per hour although obviously the automatic clutch may be arranged so that it will operate at a higher or a lower speed according to preference. Therefore, when the motor vehicle is driven above the critical speed, it will be apparent that the centrifugal force acting on element 35 will move the element so that the clutching portion 48 thereof is projected outwardly into engagement with the inner cylindrical surface of the hollow extension 33. During the direct drive between shafts 10 and 11, the difference in speed of the centrifugal element 35 and the slots 34 is sufficient to prevent the centrifugal element from entering one of the slots since under such conditions the centrifugal element will jump across the slots, it being customary to facilitate this jumping action by providing a suitable cam face on the clutching portion 48 as is now well known in the art.

With the centrifugal element 35 projected outwardly during the direct drive, a momentary release of the accelerator pedal will cause a reduction in the speed of shaft 10 relative to that of shaft 11 thereby releasing the clutch A as aforesaid, the member 42 rapidly dropping to the speed of cylinder 32 so that these members are quickly synchronized at which time the centrifugal element 35 quickly moves outwardly into engagement with one of the slots 34. The hollow extension 33 is provided with a relatively large number of slots 34 to facilitate the entry of the centrifugal element 35 into one of these slots just at the time of synchronization in the speeds of the two members of the automatic clutch C but in the event that the centrifugal element 35 fails to enter one of the slots 34, it will be apparent that the clutch B will come into action to prevent a further dropping in speed of shaft 10 below that of cylinder 32 so that when the operator again depresses the accelerator pedal the centrifugal element will immediately move outwardly into the next adjacent slot 34 to then effect a positive coupling between the driving shaft 10 and the hollow portion 31.

When the centrifugal element 35 is engaged with one of the slots 34 as aforesaid, shafts 10 and 11 are positively connected for a two-way drive with shaft 10 driving shaft 11 at a speed ratio greater than one to one and depending on the value of the planetary gear train. This drive passes from shaft 10 to the members 41 and 42, through the centrifugal element 35 to the hollow portion 31 and thence through the planetary gears 26 to the cylindrical member 24, the drive then passing directly out through the driven shaft 11 with the clutches A and B released.

When the speed of the motor vehicle falls sufficiently below the critical speed to cause the spring 51 to overcome the friction tending to hold the centrifugal element into engagement with one of the slots, this spring will move the end portion 49 of the centrifugal element 35 outwardly and thereby moving the opposite end portion 48 inwardly free from engagement with the slots 34 to release the automatic clutch C. This restores the two-way drive between shafts 10 and 11 as outlined above for the normal direct driving conditions, it being noted that the cycle of operation for direct drive or for overdrive is entirely automatic and immediately responsive to normal driving conditions.

It will furthermore be noted that when the operator manipulates the usual well-known mechanism to reverse the normal direction of rotation of driving shaft 10 by shifting gear 103 and key 110 rearwardly for reversing the direction of movement of the motor vehicle, the counterclockwise movement of shaft 10 will be accompanied by a release of clutch A (rollers 55 being shifted to their neutral positions) and an engagement of clutch B so that the driven shaft 11 will be rotated in its reverse direction through clutch B and the planetary gearing in response to reversing the drive of shaft 10.

It will furthermore be noted that my transmission provides means for preventing undesired backward roll of the vehicle. Thus, when driven shaft 11 tends to drive the shaft 10 in a reverse direction relative to the normal forward driving rotation of these shafts, clutch A automatically locks shafts 10 and 11 followed by locking of clutch B. Shaft 11 thus cannot drive shaft 10 since the planetary gear train becomes locked, it being remembered that sun gear 37 is fixed to the casing. When backward roll of the vehicle is desired, free from a coupling of the engine as is frequently desirable, the operator may shift the transmission gear 103 into its reverse position which renders clutch A inoperative, clutch B then overrunning. Under such conditions the vehicle may be rolled backwards with shaft 10 free to remain stationary.

If desired, an automatic control may be arranged for the centrifugal element 35 of the automatic clutch C so that even when the direct drive between shafts 10 and 11 is sufficient to urge the centrifugal element outwardly by the centrifugal force acting thereon, the centrifugal element will nevertheless be held inwardly against movement toward the slots 34 until the operator releases the accelerator pedal sufficiently to slow down the speed of shaft 10 below that of shaft 11 for causing an overrunning action at the clutch A. One form of such control is disclosed in my co-pending application Serial No. 31,321 filed July 15, 1935 and in Figs. 5 and 6 I have illustrated this control applied to the overdrive of Figs. 1 to 4. In Figs. 5 and 6 similar reference characters indicate parts which have the same construction and operation as those previously described so that such parts will not need further reference. The construction of the centrifugal element 35ª of the automatic clutch C' and the construction of the cage 56ª of the clutch A' are however slightly varied as follows:

One of the end portions of the centrifugal element 35ª such as the clutching portion 48ª thereof is provided with a slot 62 in a side face thereof adapted for engagement with a finger extension 63 of cage 56ª, this extension projecting forwardly from the cage through an opening 64 of the cam carrying member 41ª, the latter member being otherwise similar to the aforesaid member 41 of Fig. 1. The opening 64 has sufficient clearance with cage extension 63 so that relative rotational movement may take place between the cage and member 41ª to a limited extent such as normally takes place by the small amount of movement of rollers 55 of clutch A' when these rollers move relative to member 41ª during their wedging operation and the overrunning action.

The operation of the Fig. 5 mechanism is substantially the same as that described in connection with the Fig. 1 mechanism and will not therefore be repeated except in so far as this operation is modified by the action of cage extension 63 and the slot 62 of the centrifugal element or pawl 35ª. It will furthermore be understood that key 110 cooperates with the reverse shift gear as in Fig. 1, the latter gear being omitted in the Fig. 5 showing.

When shaft 10 is driving shaft 11 in the direct drive through the clutch A', the position of rollers 55 is such that the cage 56ª occupies the position illustrated in Fig. 6 wherein the cage extension 63 is moved to engage the slot 62. It will, therefore, be apparent that during this direct drive, even when the driving shaft rotates at a speed above the critical speed of clutching action for the clutch C', outward movement of the clutching portion 48ª of the centrifugal element 35ª will be prevented by the projection 63 and the centrifugal element will not be released for clutching movement until the driving shaft is slowed down accompanied by an overrunning action at clutch A'. At such time the rollers 55 have a small amount of movement accompanied by a corresponding movement in the cage 56ª sufficient to move the projection 63 clear of the slot 62 and thereby permit the synchronizing action between the centrifugal element and the slots 34 and entry of the clutching portion 48ª into one of these slots as previously described. When the drive falls below the critical speed for clutch C', the centrifugal element 35ª will be moved inwardly by the spring 51 thereby restoring the slot 62 in rotational alignment with the projection 63 so that the normal direct drive shafts 10 and 11 may again take place.

Referring now to Figs. 7 and 8, I have illustrated a somewhat modified arrangement of parts although the advantages of the mechanism and the operation thereof are as heretofore set forth in connection with the Fig. 1 mechanism. In this modification, the driving shaft 10' has its rearwardly splined end 40' engaged by a hub 65 of the planetary carrier 29' which has the same planetary gears 26 mounted on shafts 27 and other associated parts designated by reference characters similar to those shown in Fig. 1.

Splines 40' are also engaged by the driving cam carrying member 41' of the right hand or direct driving overrunning clutch A" which has a construction similar to the aforesaid clutch A. The driven shaft 11' has a forwardly extending end 66 rotatably centered in a piloting bearing 67 within the rear end of driving shaft 10', the driven shaft in this instance having splines 68 drivingly mounting the cam carrying member 42' for the oppositely acting or left hand overrunning clutch B" which may be similar in construction and operation to the clutch B of Fig. 1. The driven shaft may also have a further bearing support as indicated at 15'.

The outer clutching portion 19' of the overrunning clutch A" in this instance is formed as a hollow member having at its rear end a plurality of circumferentially spaced slots 69 engaged by the projections 70 of the member 42'. The hollow member 19' provides a cage or carrier 71 for the centrifugal clutching element 35' of the automatic clutch C". The forward end of cylinder 24' is journalled by a bearing assembly 72 carried by hub 65. This bearing 72 not only rotatably centers the cylinder 24' and internal gear 25' but also absorbs the thrust on the internal gear where helical planetary gear set is employed for very quiet operation.

The planetary gears 26 engage the internal gear 25' carried by the cylindrical member 24' which is formed with the series of slots 34' adapted for engagement with the clutching portion 48' of the centrifugal element 35'. At its rear end, the cylindrical member 24' is provided with a series of circumferentially spaced openings 73 for driving connection with the projections 74 of the outer member 31' of the clutch B".

In connection with the reverse mechanism of Fig. 7, it being understood that key 110' is shifted as in the Fig. 1 disclosure and description, the key enlargement 114' has a bevel 118' similar to the aforesaid bevel 118 and for the same purpose. In Fig. 7 the shifting movements of key 110' and enlargement 114' are accommodated by corresponding grooves 109' in shaft 10' and grooves 116' and 117' respectively formed in pawl 35' and member 41'. Rearward shifting of key enlargement 114' is accommodated by the recess 121' in member 42'.

The operation of the Fig. 7 mechanism is generally similar to that described at length in connection with the Fig. 1 mechanism, the normal direct drive between shafts 10' and 11' passing through member 41', the right hand overrunning clutch A" to the hollow member 19' and thence through the member 42' to the driven shaft 11', the left hand running clutch B" being released for overrunning. During this direct drive the hub 65 of planetary carrier 29' will rotate the planetary gears 26 causing the cylindrical member 24' and slots 34' to be driven from shaft 10' and at a faster speed with respect thereto. During the direct drive below the critical speed of clutch engagement for the automatic clutch C", shaft 11' may also drive shaft 10' for using the engine as a brake, this action taking place generally as before described by an overrunning action at clutch A" and a clutching operation at clutch B" when the speed of the member 31' reduces to approximate synchronization with the speed of the cam carrying member 42' for the clutch B". The driven shaft then drives through the clutch B", cylindrical member 24' and the planetary gearing to the hub 65 for driving shaft 10'.

When the normal direct drive between shafts 10' and 11' is taking place above the critical speed of automatic clutch C", the centrifugal element 35' will be urged outwardly as before but cannot engage the slots 34' because of the difference in rotational speeds between the centrifugal element 35' and the slots 34'. However, on a reduction in the speed of driving shaft 10' the clutch A" will overrun, the rotational speed of centrifugal element 35' continuing with driven shaft 11' by reason of the driving connection at 69, 70 and when the rotational speed of the cylindrical member 24' and slots 34' reduces to synchronization with the rotational speed of the centrifugal element 35', the centrifugal element will move outwardly to engage a slot 34' as before. Also, in the event that the centrifugal element does not engage one of the slots 34' at the time of synchronization, the clutch B'' will come into operation to hold the parts of the automatic clutch C' substantially at their synchronized speeds of the engagement so that the next time the driving shaft 10' is operated to drive the vehicle forwardly, the centrifugal element will immediately engage one of the slots. In either event, the overdrive will then be in operation whereby the driving shaft 10' drives through hub 65, thence through the planetary gear train to the centrifugal element 35', the drive then passing through the hollow member 19' and member 42', to operate the driven shaft 11' at an overdrive speed ratio, the clutch A'' overrunning.

In Fig. 7 the planetary gears 26 engage the sun gear 36' which is stationary as before although in this instance the sun gear is carried by a sleeve 37' provided with extended teeth adapted to be engaged with the internal teeth 75 of the fixed casing member 38'.

In order to somewhat facilitate entry of the centrifugal pawl portion 48' into one of the slots 34' approximately at synchronization of their speeds, one or both side faces of the pawl portion may be beveled at 76 preferably to an extent less in radial distance than the engaged depth of slots 34' so that after full clutching movement of the pawl 35' there is no undue clearance between the pawl and a slot which might be objectionable for the two-way drive through the clutch C'' and the overdrive gearing.

Various modifications and changes will be apparent from the teachings of my invention, as set forth in the appended claims, and it is not my intention to limit my invention to the particular details of construction and operation shown and described for illustrative purposes.

What I claim is:

1. In a drive for a motor vehicle having a power driving shaft and a shaft driven therefrom and adapted to drive the vehicle, means including a gear train adapted for operation between said shafts for driving said driven shaft at a speed different than that of said driving shaft, speed responsive clutching means including clutching structures respectively adapted for driving connection with said driving and driven shafts at least when said structures are clutched for automatically connecting said shafts through said gear train driving means, clutching means providing a releasable direct drive from said driving shaft to said driven shaft, and clutching means providing a releasable drive from said driven shaft to said driving shaft, the last said clutching means including cooperating rotatable clutching members respectively drivingly connected to said driving and driven shafts.

2. In a drive for a motor vehicle having a power driving shaft and a shaft driven therefrom and adapted to drive the vehicle, means including a gear train adapted for operation between said shafts for driving said driven shaft at a speed different than that of said driving shaft, speed responsive clutching means including clutching structures respectively adapted for driving connection with said driving and driven shafts at least when said structures are clutched for automatically connecting said shafts through said gear train driving means, clutching means providing a releasable direct drive from said driving shaft to said driven shaft, and releasable clutching means including clutchable members respectively drivingly connected to an element of said gear train and to one of said shafts providing a reduction drive from said driven shaft to said driving shaft.

3. In a drive for a motor vehicle having a power driving shaft and a shaft driven therefrom and adapted to drive the vehicle, means including a gear train adapted for operation between said shafts for driving said driven shaft at a speed different than that of said driving shaft, speed responsive clutching means including clutching structures respectively adapted for driving connection with said driving and driven shafts at least when said structures are clutched for automatically connecting said shafts through said gear train driving means, and a plurality of oppositely acting overrunning clutches respectively adapted for drivingly connecting said shafts for a direct drive to said driven shaft and for a drive in the opposite direction to said driving shaft through the intermediary of said gear train means, each of said overrunning clutches including a pair of rotatable clutching members respectively adapted to be driven from said driving and driven shafts.

4. In a drive for a motor vehicle having a power driving shaft and a shaft driven therefrom and adapted to drive the vehicle, means including a gear train adapted for operation between said shafts for driving said driven shaft at a speed different than that of said driving shaft, speed responsive clutching means including clutching structures respectively adapted for driving connection with said driving and driven shafts at least when said structures are clutched for automatically connecting said shafts through said gear train driving means, one of said clutching structures including a centrifugal force actuated clutching element adapted for clutching engagement with the other when the rotational speeds of said structures are substantially synchronized, one-way clutch driving means operably connecting said shafts for a releasable direct drive from said driving shaft to said driven shaft, and one-way clutch driving means operably connecting said clutching structures for drivingly connecting said shafts through said gear train means to provide a releasable drive from said driven shaft to said driving shaft.

5. In a drive for a motor vehicle having a power driving shaft and a shaft driven therefrom and adapted to drive the vehicle, means including a gear train adapted for operation between said shafts for driving said driven shaft at a speed different than that of said driving shaft, speed responsive clutching means including clutching structures respectively adapted for driving connection with said driving and driven shafts at least when said structures are clutched for automatically connecting said shafts through said gear train driving means, one of said clutching structures including a centrifugal force actuated clutching element adapted for clutching engagement with the other when the rotational speeds of said structures are substantially synchronized, one-way clutch driving means operably connecting said shafts for a releasable direct drive from said driving shaft to said driven shaft, and one-way clutch driving means having clutching members respectively drivingly connected to rotate with said clutching structures for overrunning action therebetween during said direct drive, the last said one-way clutch being adapted to provide a drive from said driven shaft to said driving shaft through the intermediary of said gear train means.

6. In a change speed transmission, a drive shaft, a driven shaft, an overrunning clutch operably connecting said shafts for a direct drive from said drive shaft to said driven shaft, a second overrunning clutch including clutching members, means for driving one of said members from and in the same direction as one of said shafts, means including a gear train for driving the other of said members from the other of said shafts, said second overrunning clutch acting to clutch said members thereof in response to overrun of said driven shaft relative to said driving shaft.

7. In a power transmission, driving and driven shafts, complementary oppositely acting overrunning clutch cam members drivingly connected to one of said shafts, each of said cam members having an opening, said openings being registered to provide a guideway, a clutching element slidably mounted in said guideway and adapted for movement by centrifugal force acting thereon, rollers engaging said cam members, cylindrical members engaging said rollers, means for drivingly connecting the cylindrical members with the other of said shafts, one of said cylindrical members having a slot adapted to receive said clutching element.

8. In a drive for a motor vehicle having a power driving shaft and a shaft driven therefrom and adapted to drive the vehicle, means including a planetary gear train adapted for operation between said shafts for driving said driven shaft at a speed different than that of said driving shaft, speed responsive clutching means including clutching structures respectively adapted for driving connection with said driving and driven shafts at least when said structures are clutched for automatically connecting said shafts through said gear train driving means, clutching means providing a releasable direct drive from said driving shaft to said driven shaft, and clutching means providing a releasable drive from said driven shaft to said driving shaft, the last said clutching means including rotatable clutching elements respectively drivingly connected to one of said shafts and to a gear element of said planetary gear train.

9. In a drive for a motor vehicle having a power driving shaft and a shaft driven therefrom and adapted to drive the vehicle, means including a gear train adapted for operation between said shafts for driving said driven shaft at a speed different than that of said driving shaft, speed responsive clutching means including clutching structures respectively adapted for driving connection with said driving and driven shafts at least when said structures are clutched for automatically connecting said shafts through said gear train driving means, a right hand releasable clutch operably connecting said shafts, and a left hand releasable clutch having clutching members respectively drivingly connected to rotate with said clutching structures.

10. In a motor vehicle drive, a driving shaft, a driven shaft aligned therewith, means including planetary gearing intermediate said shafts for driving said driven shaft at a speed greater than that of said driving shaft, said intermediate driving means including cooperating clutching members, one of which is movable by centrifugal force for clutching engagement with the other when the speeds of said clutching members are substantially synchronized, clutching means providing a one-way direct drive between said shafts, and clutching means including clutching elements respectively drivingly connected to rotate with said clutching members for providing a one-way drive from said driven shaft to said driving shaft through said planetary gearing.

11. In a motor vehicle drive, a driving shaft, a driven shaft aligned therewith, means including planetary gearing intermediate said shafts for driving said driven shaft at a speed greater than that of said driving shaft, said intermediate driving means including cooperating clutching members, one of which is movable by centrifugal force for clutching engagement with the other when the speeds of said clutching members are substantially synchronized, roller clutch means providing a one-way direct drive between said shafts, and roller clutch means including clutching elements respectively drivingly connected to rotate with said clutching members for providing a one-way drive from said driven shaft to said driving shaft through said planetary gearing.

12. In a motor vehicle drive, a driving shaft, a driven shaft aligned therewith, means intermediate said shafts for driving said driven shaft from and at a speed different from that of said driving shaft, said intermediate driving means including a fixed sun gear, an internal gear having a driving member carried therewith, a planetary gear meshing with said sun and internal gears and having a driving member carried therewith, cooperating clutching members, one of which is movable by centrifugal force for engagement with the other when the speeds of said clutching members are substantially synchronized, one of said clutching members being drivingly carried by one of said driving members, means for drivingly connecting the other of said clutching members to one of said shafts, means providing a releasable direct drive between said shafts, and means providing a releasable drive for driving one of said shafts from the other in a direction opposite to said direct drive and through the intermediary of said planetary gear.

13. In a motor vehicle drive, a driving shaft, a driven shaft aligned therewith, means intermediate said shafts for driving said driven shaft from and at a speed greater than said driving shaft, said intermediate driving means including a fixed sun gear, an internal gear having a driving member carried therewith, a planetary gear meshing with said sun and internal gears and having a driving member carried therewith, means for drivingly connecting one of said driving members with one of said shafts, the other of said driving members being provided with a slot, a centrifugal force actuated clutching element drivingly connected to the other of said shafts and adapted for clutching engagement with said slot when the speeds of said slot and clutching element are substantially synchronized, means for releasably drivingly connecting said shafts for a direct drive therebetween prior to clutching engagement of said clutching element, means controlled by said releasable direct drive means for controlling movement of said clutching element, and means for releasably drivingly connecting said shafts through the intermediary of said planetary gear for driving said driving shaft from said driven shaft.

14. In a motor vehicle drive, a driving shaft, a driven shaft aligned therewith, means intermediate said shafts for driving said driven shaft from and at a speed greater than said driving shaft, said intermediate driving means including a fixed sun gear, an internal gear having a driving member carried therewith, a planetary gear meshing with said sun and internal gears and having a driving member carried therewith, means for continuously driving one of said driving members from one of said shafts, a clutching element continuously drivingly connected with the other of said shafts and adapted for movement by centrifugal force to provide a driving connection between the last said shaft and the other of said driving members, overrunning clutch means between said shafts providing a direct drive therebetween, and means operating in response to overrun of said overrunning clutch means for releasably drivingly connecting said shafts through said planetary gear independently of said clutching element.

15. In a transmission, a driving shaft, a driven shaft, overrunning clutch means between said shafts for releasably coupling said shafts for a drive therebetween, means including an automatically operating clutch for drivingly connecting said shafts around said overrunning clutch, said automatically operating clutch including clutching members respectively adapted for driving connection with said shafts at least during clutching engagement thereof, one of said clutching members being engageable with the other in response to substantially synchronized rotational speeds of said members during overrun between said shafts, and means for releasably coupling said shafts during said overrun independently of clutching engagement of said members and in response to a predetermined reduction in the rotational speed of one of said clutching members with respect to the speed of the other of said clutching members.

16. In a transmission, a driving shaft, a driven shaft, overrunning clutch means between said shafts for releasably coupling said shafts for a forward drive therebetween, means including an automatically operating clutch for drivingly connecting said shafts around said overrunning clutch, said automatically operating clutch including clutching members respectively adapted for driving connection with said shafts at least during clutching engagement thereof, one of said clutching members being engageable with the other in response to substantially synchronized rotational speeds of said members during overrun between said shafts, one-way clutch means for releasably coupling said shafts for a one-way drive therebetween in a direction opposite to that through said overrunning clutch means and in response to substantially synchronized rotational speeds of said clutching members, and manually controlled means for rendering said overrunning clutch means inoperative to provide a reverse drive from said driving shaft to said driven shaft through the intermediary of said one-way clutch means.

17. In a power driving mechanism, driving and driven shafts, means including a planetary gear train for driving said driven shaft from said driving shaft, said planetary gear train comprising sun, planetary and internal gears having helical teeth, a carrier for said planetary gear drivingly connected to one of said shafts, clutching means for releasably drivingly connecting said internal gear to the other of said shafts, and a thrust bearing between said internal gear and said carrier adapted to rotatably journal said internal gear and to absorb the axial thrust on said internal gear incident to operation of said helically toothed gears.

18. In a drive for a motor vehicle having a power driving shaft and a shaft driven therefrom and adapted to drive said vehicle, overdriving means including planetary gearing between said shafts for driving said driven shaft at a speed greater than the speed of the driving shaft, and a speed responsive clutch controlling said overdriving means, said clutch including clutching structures respectively adapted for driving connection to said driving and driven shafts at least when said structures are clutched, said clutch being adapted to automatically connect said shafts through said planetary gearing, an overrunning clutch between said shafts for transmitting a direct one-way drive from said driving shaft to said driven shaft, and an oppositely acting overrunning clutch intermediate said clutching structures adapted to drivingly connect said shafts through said planetary gearing.

19. In a transmission, driving and driven shafts, direct driving means between said shafts releasable to provide overrunning action therebetween, speed responsive means for coupling said shafts at predetermined relative speeds thereof and when one of said shafts is rotating at or above a predetermined speed to provide a two-way drive therebetween at a speed ratio different from said direct drive, and means responsive to said overrunning action for coupling said shafts when the relative speeds thereof approximate the aforesaid relative speeds to facilitate operation of said speed responsive means and to provide a one-way drive therebetween at said speed ratio in a direction opposite to said direct drive and independently of said speed responsive coupling means when the speed of said one shaft is less than said predetermined speed at which operation of said speed responsive means takes place.

20. In a power transmission, driving and driven shafts, direct driving means between said shafts releasable to provide overrunning action therebetween in response to a reduction in the speed of the driving shaft relative to the speed of the driven shaft, clutch controlled gear train means so constructed and arranged as to drive said driven shaft from said driving shaft around said direct driving means and at a speed ratio different therefrom, the last said means including an automatically engageable clutch comprising rotatable clutching members adapted for automatic engagement when the speeds thereof are substantially synchronized to establish said speed ratio drive between said shafts, the arrangement of said clutching members and gear train being such that said clutching members have relative rotation during said direct drive and approach rotational synchronism during said overrunning action, and means including elements respectively drivingly connected with said driving and driven shafts operable in response to said overrunning action for limiting said reduction in the speed of the driving shaft to facilitate engagement of the members of said automatic clutch.

21. In a power transmission, driving and driven shafts, direct driving means between said shafts releasable to provide overrunning action therebetween in response to a reduction in the speed of the driving shaft relative to the speed of the driven shaft, clutch controlled gear train means so constructed and arranged as to drive said driven shaft from said driving shaft around said direct driving means and at a speed ratio different therefrom, the last said means including an automatically engageable clutch comprising rotatable clutching members adapted for automatic engagement when the speeds thereof are substantially synchronized to establish said speed ratio drive between said shafts, the arrangement of said clutching members and gear train being such that said clutching members have relative rotation during said direct drive and approach rotational synchronism during said overrunning action, and one-way clutching means between said clutching members acting in response to said overrunning action for limiting said reduction in the speed of the driving shaft to facilitate engagement of the members of said automatic clutch.

22. In a motor vehicle power transmission, aligned driving and driven shafts, direct driving means between said shafts including a roller clutch between said shafts releasable to permit overrunning action therebetween, means automatically operable in response to said overrunning action for operably connecting said shafts around said roller clutch for a two-way drive between said shafts at a speed ratio different from said direct drive, means operable for driving said driving shaft in reverse, and means operable in response to operation of said reverse driving means for holding the rollers of said roller clutch to provide a reverse drive to said driven shaft through the intermediary of said speed ratio driving means.

23. In a drive for a motor vehicle having a power driving shaft and a shaft driven therefrom and adapted to drive the vehicle, means including a gear train adapted for operation between said shafts for driving said driven shaft at a speed different than that of said driving shaft, speed responsive clutching means including structures respectively adapted for driving connection with said driving and driven shafts at least when said structures are clutched for automatically connecting said shafts through said gear train driving means, clutching means providing a releasable direct drive from said driving shaft to said driven shaft, clutching means providing a releasable drive from said driven shaft to said driving shaft, the last said clutching means including cooperating rotatable clutching members respectively drivingly connected to said driving and driven shafts, means for reversing the normal driving direction of said driving shaft, and means shiftable in response to said reversing means for rendering the direct drive clutching means inoperative.

24. In a drive for a motor vehicle having a power driving shaft and a shaft driven therefrom and adapted to drive the vehicle, means including a gear train adapted for operation between said shafts for driving said driven shaft at a speed different than that of said driving shaft, speed responsive clutching means including clutching structures respectively adapted for driving connection with said driving and driven shafts at least when said structures are clutched for automatically connecting said shafts through said gear train driving means, clutching means providing a releasable direct drive from said driving shaft to said driven shaft, clutching means providing a releasable drive from said driven shaft to said driving shaft, the last said clutching means including cooperating rotatable clutching members respectively drivingly connected to said driving and driven shafts, means including a shiftable gear drivingly connected to said driving shaft for reversing the normal driving direction of said driving shaft, and means operated in response to shifting movement of said shiftable gear for rendering the direct drive clutching means inoperative.

25. In an engine driven motor vehicle change speed transmission, a driving shaft adapted to be driven by the engine, a driven shaft adapted to transmit the drive from said driving shaft to ground wheels of the vehicle, an overrunning clutch operably connecting said shafts for a forward direct drive therebetween, a second overrunning clutch including clutching members, means for driving one of said members from one of said shafts, means including a gear train for driving the other of said members from the other of said shafts, said second overrunning clutch acting to clutch said members thereof in response to overrun of said driven shaft relative to said driving shaft whereby to drive said driving shaft from said driven shaft when the vehicle is travelling forwardly, said overrunning clutches being arranged to automatically prevent said driven shaft from rotating in a direction opposite to its normal forwardly driving rotation when the vehicle tends to roll rearwardly, and manually controlled operating means for rendering one of said overrunning clutches inoperative to permit reverse rotation of said driven shaft free from driving connection with said driving shaft when it is desired to roll said vehicle rearwardly.

26. In an engine driven motor vehicle change speed transmission, a driving shaft adapted to be driven by the engine, a driven shaft adapted to transmit the drive from said driving shaft to ground wheels of the vehicle, an overrunning clutch operably connecting said shafts for a forward direct drive therebetween, a second overrunning clutch including clutching members, means for driving one of said members from one of said shafts, means including a gear train for driving the other of said members from the other of said shafts, said second overrunning clutch acting to clutch said members thereof in response to overrun of said driven shaft relative to said driving shaft whereby to drive said driving shaft from said driven shaft when the vehicle is travelling forwardly, said overrunning clutches being arranged to automatically prevent said driven shaft from rotating in a direction opposite to its normal forwardly driving rotation when the vehicle tends to roll rearwardly, means for drivingly connecting said driving shaft with the engine to provide for driving the driving shaft from said engine in a direction opposite to its normal forwardly driving direction when it is desired to drive the vehicle reversely, and means operated in response to the last said means for rendering one of said overrunning clutches inoperative for driving said driven shaft through the other of said overrunning clutches to provide said reverse vehicle drive.

27. In an engine driven motor vehicle change speed transmission, a driving shaft adapted to be driven by the engine, a driven shaft adapted to transmit the drive from said driving shaft to ground wheels of the vehicle, an overrunning clutch operably connecting said shafts for a forward direct drive therebetween, a second overrunning clutch including clutching members, means for driving one of said members from one of said shafts, means including a gear train for driving the other of said members from the other of said shafts, said second overrunning clutch acting to clutch said members thereof in response to overrun of said driven shaft relative to said driving shaft whereby to drive said driving shaft from said driven shaft when the vehicle is travelling forwardly, said overrunning clutches being arranged to automatically prevent said driven shaft from rotating in a direction opposite to its normal forwardly driving rotation when the vehicle tends to roll rearwardly, means for drivingly connecting said driving shaft with the engine to provide for driving the driving shaft from said engine in a direction opposite to its normal forwardly driving direction when it is desired to drive the vehicle reversely, and means operated in response to the last said means for rendering one of said overrunning clutches inoperative for driving said driven shaft through the other of said overrunning clutches to provide said reverse vehicle drive, said last named means being so constructed and arranged as to permit rearward roll of the vehicle, with said driven shaft rotating free from driving connection with said driving shaft.

28. In a motor vehicle transmission, driving and driven shafts, an overrunning clutch between said shafts providing a direct forward drive therebetween, means including a gear train for operably connecting said shafts around said overrunning clutch to drive said driven shaft from said driving shaft at a speed ratio greater than said direct drive, said gear train driving means including a second overrunning clutch having clutching members respectively drivingly connected to an element of said gear train and to one of said shafts, the clutching members of said second overrunning clutch being adapted for overrunning action therebetween when said driving shaft drives said driven shaft through the first said overrunning clutch.

29. In a motor vehicle transmission driving and driven shafts, an overrunning clutch between said shafts providing a direct forward drive therebetween, means including a gear train for operably connecting said shafts around said overrunning clutch to drive said driven shaft from said driving shaft at a speed ratio different from said direct drive, said gear train driving means including a second overrunning clutch having clutching members respectively drivingly connected to an element of said gear train and to said driving shaft for rotation at the same speed and in the same direction as said driving shaft, the clutching members of said second overrunning clutch being arranged for overrunning action therebetween when said driving shaft drives said driven shaft through the first said overrunning clutch.

30. In a motor vehicle transmission, driving and driven shafts, an overrunning clutch between said shafts providing a direct forward drive therebetween, means including a gear train for operably connecting said shafts around said overrunning clutch to drive said driven shaft from said driving shaft at a speed ratio greater than said direct drive, said gear train driving means including a second overrunning clutch having clutching members respectively drivingly connected to an element of said gear train and to said driven shaft, the clutching members of said second overrunning clutch being arranged for overrunning action therebetween when said driving shaft drives said driven shaft through the first said overrunning clutch.

31. In a motor vehicle driving mechanism, a driving shaft, a driven shaft, releasable forward direct driving means between said shafts, clutch controlled gear train forward driving means operably connecting said shafts around said releasable driving means and including rotatable clutching elements respectively adapted for driving connection to said driving and driven shafts for relatively different rotational speeds during said direct drive, means preventing engagement of said clutching elements until the speeds thereof are substantially synchronized, and means operably connected to said driving and driven shafts operating in response to release of said releasable direct driving means for driving said driving shaft from said driven shaft through said gear train means with said clutching elements rotated at substantially the same speed.

32. In a motor vehicle driving mechanism, a driving shaft, a driven shaft, means operable to reverse the normal direction of drive of said driving shaft to drive the vehicle in reverse, gear train means operably connecting said shafts for driving said driven shaft from said driving shaft at a speed ratio different from a 1 to 1 drive therebetween, means for operably connecting said shafts for a 1 to 1 drive therebetween, said speed ratio and said 1 to 1 drives acting to drive the vehicle forwardly, and means operably connecting said driving shaft with an element of said gear train means for driving said driven shaft through said gear train means from said driving shaft in response to operation of said reverse operating means when it is desired to drive the vehicle in reverse.

33. In a change speed transmission, a driving shaft, a driven shaft, means providing a drive from the driving shaft to the driven shaft, means providing a second relatively faster drive from said driving shaft to said driven shaft, said second drive means including an automatically operating centrifugal clutch responsive to predetermined drop in the speed of the driving shaft for establishing the drive through said second drive means, said clutch comprising members centrifugally engaged only when rotated in approximate unison at or above a predetermined speed, and means acting to limit the extent of drop in the speed of the driving shaft to a point at which said clutch members are rotated in approximate unison.

WILLIAM T. DUNN.